(12) United States Patent
Kovak

(10) Patent No.: US 7,234,691 B2
(45) Date of Patent: Jun. 26, 2007

(54) RADIAL-CROSSFLOW DISTILLATION TRAYS FOR DIVIDED WALL COLUMN APPLICATIONS

(75) Inventor: Kenneth William Kovak, Macungie, PA (US)

(73) Assignee: Air Products and Chemicals, Inc., Allentown, PA (US)

(*) Notice: Subject to any disclaimer, the term of this patent is extended or adjusted under 35 U.S.C. 154(b) by 125 days.

(21) Appl. No.: 11/133,547

(22) Filed: May 20, 2005

(65) Prior Publication Data
US 2006/0260926 A1 Nov. 23, 2006

(51) Int. Cl.
B01F 3/04 (2006.01)
B01D 3/16 (2006.01)

(52) U.S. Cl. ............... 261/114.1; 261/114.5; 202/158; 203/70; 62/640; 29/462

(58) Field of Classification Search .. 261/114.1–114.5; 202/158; 203/70; 62/640; 29/428, 462
See application file for complete search history.

(56) References Cited

U.S. PATENT DOCUMENTS

| | | | |
|---|---|---|---|
| 1,915,746 A | 6/1933 | Moore | |
| 1,950,313 A | 3/1934 | Linde | |
| 2,319,814 A | 5/1943 | Harmon | |
| 3,338,566 A * | 8/1967 | Kittel | 261/113 |
| 3,686,075 A * | 8/1972 | Spahn et al. | 202/158 |
| 3,814,397 A * | 6/1974 | Geist et al. | 261/114.1 |
| 4,129,626 A * | 12/1978 | Mellbom | 261/114.3 |
| 4,171,335 A * | 10/1979 | Planovsky et al. | 261/155 |
| 4,230,533 A * | 10/1980 | Giroux | 203/1 |
| 4,582,569 A * | 4/1986 | Jenkins | 202/158 |
| 4,826,574 A * | 5/1989 | Gourlia et al. | 202/158 |
| 5,518,668 A * | 5/1996 | Chresand et al. | 261/113 |
| 5,709,780 A * | 1/1998 | Ognisty et al. | 202/158 |
| 5,755,933 A | 5/1998 | Ognisty et al. | |
| 6,558,515 B1 * | 5/2003 | Steacy | 203/1 |
| 6,645,350 B1 | 11/2003 | Steacy | |

FOREIGN PATENT DOCUMENTS

| | | |
|---|---|---|
| DE | 903 447 | 2/1954 |
| EP | 0158851 | 10/1985 |
| EP | 1 108 966 A1 | 6/2001 |
| FR | 2267811 A2 | 12/1975 |
| SU | 463 455 | 3/1975 |

* cited by examiner

Primary Examiner—Scott Bushey
(74) Attorney, Agent, or Firm—Willard Jones, II

(57) ABSTRACT

An assembly of trays in a divided wall column having an inner column wall, a dividing wall, and an interior space includes: a first tray having at least one radial downcomer adjacent the dividing wall and extending radially toward the inner column wall a first substantial distance, and a first liquid receiving area having a radial axis at a first angle to the dividing wall and extending radially toward the inner column wall a second substantial distance; and a second tray below the first tray, the second tray having at least one other downcomer having a radial axis at a second angle to the dividing wall and extending radially toward the inner column wall a third substantial distance, and at least one second liquid receiving area adjacent the dividing wall and extending radially toward the inner column wall a fourth substantial distance.

21 Claims, 3 Drawing Sheets

RADIAL-CROSSFLOW DISTILLATION TRAYS FOR DIVIDED WALL COLUMN APPLICATIONS

BACKGROUND OF THE INVENTION

The present invention relates to liquid-vapor contact trays for use in divided wall exchange columns for heat and/or mass transfer processes. The invention has particular application in cryogenic air separation processes utilizing distillation, although it also may be used in other heat and/or mass transfer processes which use such trays.

As used herein, the term "column" (or "exchange column") means a distillation or fractionation column or zone, i.e., a column or zone where liquid and vapor phases are countercurrently contacted to effect separation of a fluid mixture, such as by contacting of the vapor and liquid phases on packing elements or on a series of vertically-spaced trays or plates mounted within the column.

Cryogenic separation of air is carried out by passing liquid and vapor in countercurrent contact through a distillation column. A vapor phase of the mixture ascends with an ever increasing concentration of the more volatile components (e.g., nitrogen) while a liquid phase of the mixture descends with an ever increasing concentration of the less volatile components (e.g., oxygen). Various packings or trays may be used to bring the liquid and gaseous phases of the mixture into contact to accomplish mass transfer between the phases.

A divided wall column is in principle a simplification of a system of thermally coupled distillation columns. In divided wall columns, a dividing wall is located in the interior space of the column. The dividing wall generally is vertical. Two different mass transfer separations may occur on either side of the dividing wall.

The exchange column usually contains some form of vapor-liquid contacting device which may be in the form of packing, such as random or structured packing, or in the form of a fractionation tray(s). A fractionation tray typically comprises a large flat area referred to as the decking or contacting deck of the tray plus means to deliver liquid to the tray from the next tray above and to remove liquid for passage to the next tray below.

The liquid being removed from the tray flows through a part of the tray referred to as a downcomer. The downcomer is a conduit for downward passing of liquid arranged in an opening in a panel of the contacting deck. In some downcomers, a part of the wall of the downcomer may extend above the panel and is called the outlet weir, and the part of the downcomer extending below the panel is called the downcomer apron. However, outlet weirs often are separate mechanical pieces and not necessarily an extension of the downcomer wall. In fact, trays may be designed without outlet weirs.

Vapor generated in the lower portion of the column passes upward through perforations in the decking, while the liquid flows downward from tray to tray countercurrent to the vapor. With a "crossflow tray" the liquid first enters upon a tray from the downcomer of the tray above. It then passes across the decking of the tray and finally exits through an outlet downcomer of the tray. U.S. Pat. No. 6,645,350 (Steacy) discloses one type of "crossflow tray."

During normal operation, liquid collected on a tray flows over a perforated panel of the deck where it is contacted with upwardly flowing vapor passing through the perforations. Then the liquid flows over the outlet weir into the downcomer and onto the receiving area of the perforated panel of the tray below, and so on. The downcomers of two adjacent trays are not placed directly above each other, but spaced apart in lateral direction (or staggered) in order to prevent liquid from falling directly into the downcomer of the lower tray.

One type of prior art tray uses a "racetrack" tray design, which has liquid flowing around an annular area with downcomers also placed radially. For example, U.S. Pat. No. 1,950,313 (Linde) discloses a "racetrack" tray.

It is desired to have an improved tray or trays for use in a divided wall exchange column which overcomes many of the difficulties and disadvantages of the prior art to provide better and more advantageous results.

It is further desired to have an improved cryogenic air separation plant having an improved tray or trays for use in a divided wall exchange column which overcomes many of the difficulties and disadvantages of the prior art to provide better and more advantageous results.

BRIEF SUMMARY OF THE INVENTION

The present invention is an assembly of a plurality of vertically spaced apart trays for fractional distillation in a divided wall exchange column. The invention also includes a divided wall exchange column containing such an assembly of trays, a method for assembling such an assembly of trays, and various processes wherein fluid-fluid contact or liquid-vapor contact is established by such an assembly of trays. There are many embodiments of the invention and many variations of those embodiments.

In a first embodiment of the assembly of a plurality of vertically spaced apart trays for fractional distillation in a divided wall exchange column, the exchange column has an inner column wall, a dividing wall, a cross sectional area, and an interior space between the inner column wall and the dividing wall. The assembly of trays includes a first tray disposed in the interior space and a second tray disposed in the interior space below the first tray. The first tray has at least one radial downcomer and a first liquid receiving area. The at least one radial downcomer is adjacent the dividing wall and extends radially toward the inner column wall a first substantial distance across the cross sectional area. The first liquid receiving area has a radial axis at a first angle to the dividing wall and extends radially toward the inner column wall a second substantial distance across the cross sectional area. At least a portion of a flow of liquid received from above on the first liquid receiving area flows across a portion of the first tray from the first liquid receiving area to the at least one radial downcomer. The at least one radial downcomer is adapted to receive and transmit downward at least part of said flow of liquid. The second tray has at least one other downcomer having a radial axis at a second angle to the dividing wall and extends radially toward the inner column wall a third substantial distance across the cross sectional area. The at least one second liquid receiving area is adjacent the dividing wall and extends radially toward the inner column wall a fourth substantial distance across the cross sectional area. The at least one second liquid receiving area is adapted to receive at least a portion of said flow of liquid transmitted downward from the at least one radial downcomer. At least part of a flow of liquid received on the second liquid receiving area flows across a portion of the second tray from the second receiving area to the at least one other downcomer. The at least one other downcomer is adapted to receive and transmit downward at least part of said flow of liquid.

In a variation of the first embodiment of the assembly of trays, at least one of the first angle and the second angle is about 90°. In another variation, at least one of the first angle and the second angle is greater than 90°. In yet another variation, at least one of the first angle and the second angle is less than 90°.

In another variation of the first embodiment of the assembly of trays, a first portion of the flow of liquid received from above on the first liquid receiving area flows in a clockwise direction from the first liquid receiving area and a second portion of said flow of liquid flows in a counter clockwise direction from the first liquid receiving area. In yet another variation, a first part of the flow of liquid received on the second liquid receiving area flows in a counter clockwise direction toward the at least one other downcomer and a second part of said flow of liquid flows in a clockwise direction toward the at least one other downcomer. In still yet another variation, the at least a portion of the flow of liquid flows across the portion of the first tray in a first direction and the at least part of the flow of the liquid flows across the portion of the second tray in a second direction opposite the first direction.

A second embodiment of the assembly of trays is similar to the first embodiment but also includes a plurality of apertures or other vapor passing means in or on at least a portion of at least one of the first tray and the second tray.

A third embodiment of the assembly of trays is similar to the first embodiment, but also includes at least one liquid mixer in fluid communication with at least one of the at least one radial downcomer and the at least one other downcomer, the at least one liquid mixer being adapted to mix a plurality of liquid compositions.

A fourth embodiment of the assembly of trays is similar to the first embodiment, but also includes a divider pan adjacent the dividing wall, wherein the at least one radial downcomer and the at least one other downcomer extend radially from the divider pan to the inner column wall.

A fifth embodiment of the assembly of trays is similar to the first embodiment, but also includes at least one outlet weir on the first tray adjacent the at least one radial downcomer.

A sixth embodiment of the assembly of trays is similar to the first embodiment, but also includes at least one outlet weir on the second tray adjacent the at least one other downcomer.

A seventh embodiment of the assembly of trays is similar to the first embodiment, but includes several additional elements and features. In the seventh embodiment, there are a plurality of apertures or other vapor passing means in or on at least a portion of the first tray, and a first portion of the flow of liquid received from above on the first liquid receiving area flows in a clockwise direction from the first liquid receiving area and a second portion of said flow of liquid flows in a counter clockwise direction from the first liquid receiving area. Also, there is a plurality of apertures or other vapor passing means in or on at least a portion of the second tray, and a first part of the flow of liquid received on the second liquid receiving area flows in a counter clockwise direction toward the at least one other downcomer (a "central" downcomer) and a second part of said flow of liquid flows in a clockwise direction toward the at least one other ("central") downcomer.

An eighth embodiment of the assembly of trays is similar to the first embodiment, but also includes additional elements and features. There are a plurality of apertures or other vapor passing means in or on at least a portion of the first tray and in or on at least a portion of the second tray. The radial downcomer(s) and the first liquid receiving area(s) of the first tray extend radially in substantially opposite directions from each other, and the other downcomer(s) and the second liquid receiving area(s) of the second tray extend radially in substantially opposite directions from each other. In addition, the at least a portion of the flow of liquid flows across a portion of the first tray in a first direction and the at least part of the flow of liquid flows across the portion of the second tray in a second direction opposite the first direction.

A ninth embodiment of the assembly of trays is similar to the seventh embodiment, but includes several additional elements and features. The first tray has a plurality of spaced apart radial downcomers and a plurality of first liquid receiving areas, each first liquid receiving area being positioned between and adjacent to two of the radial downcomers. The second tray has a plurality of spaced apart other downcomers and a plurality of second liquid receiving areas, each second liquid receiving area being positioned between and adjacent to two of the other downcomers.

Another aspect of the invention is an apparatus comprising a divided wall exchange column having an assembly of a plurality of vertically spaced apart trays for fractional distillation in the divided wall exchange column, the assembly of trays being like any one of the embodiments of the assembly of trays, or variations thereof, discussed above. In this aspect of the invention, the exchange column has an interior space divided by a dividing wall into at least a first longitudinal space having a first cross sectional area adjacent a first side of the dividing wall and a second longitudinal space having a second cross sectional area adjacent a second side of the dividing wall. In one variation, the first cross sectional area is greater than or substantially equal to the second cross sectional area. In another variation, the second cross sectional area is greater than the first cross sectional area.

Another aspect of the invention is a method for assembling an assembly of a plurality of vertically spaced apart trays for fractional distillation in a divided wall exchange column. The divided wall exchange column may be like the one discussed above, and the method for assembling includes installing an assembly of trays in the divided wall exchange column, the assembly of trays being like that of any one of the embodiments, or variations thereof, discussed above.

Other aspects of the invention are processes which utilize an assembly of trays as in any of the embodiments of the assembly of trays, or variations thereof, discussed above. One such process is a process for cryogenic air separation, which includes contacting vapor and liquid counter-currently in a divided wall exchange column containing at least one mass transfer zone wherein a liquid-vapor contact is established by an assembly of a plurality of vertically spaced apart trays as in any of the embodiments, or variations thereof, discussed above. Another such process is a process for exchanging mass and/or heat between two fluids, which includes contacting such fluids in a divided wall exchange column wherein a fluid-fluid contact is established by an assembly of a plurality of vertically spaced apart trays as in any of the embodiments, or variations thereof, discussed above.

BRIEF DESCRIPTION OF SEVERAL VIEWS OF THE DRAWINGS

The invention will be described by way of example with reference to the accompanying drawings, in which.

DETAILED DESCRIPTION OF THE INVENTION

In modern air separation plants, structured packing is most often used as the preferred mass transfer device, although trays may still be used in specific circumstances for specific applications. For some applications, structured packing may be used on one side of a dividing wall of a divided wall column, while trays may be used on the other side of the dividing wall.

When the dividing wall divides a divided wall column into segments, the resultant "D" shape presents difficulties for designing trays. The present invention, which is an assembly of trays of radial-crossflow design with radially oriented downcomers, makes the most effective use of the D shape while allowing for effective design of all the distillation tray components.

Typical divided wall column technology essentially employs one half of a traditional crossflow tray. A shortcoming of that approach is that the downcomer at the column shell wall must be of a larger area than theoretically necessary due to the need to obtain sufficient weir length for proper tray design.

The present invention places the downcomers radially, from the inside of the column toward the column wall, making the most effective use of the available area. When compared to conventional crossflow tray layouts, this arrangement yields in excess of 10% larger area for vapor flow, which is the critical parameter in sizing a distillation tray. The advantage is greatest as tray and plant sizes get larger. The advantage is also significant when the column is not divided into two equal halves, as the radial arrangement makes for more efficient use of the available area. Below a column diameter of about 2 meters the advantage diminishes.

The tray assembly of the present invention effectively uses a crossflow tray laid out on a radial pattern with different numbers of passes for different embodiments (discussed further below). The liquid flowing along the outer area of the tray along the column wall has a longer flow path than the liquid flowing along the inside of the tray near the divider pan. This difference in path length will result in liquids of different composition entering the downcomer at the outer wall as compared to the inside near the divider pan. Liquid mixers may be used to mix different compositions of liquids which may arrive at the downcomers.

Figure 1:
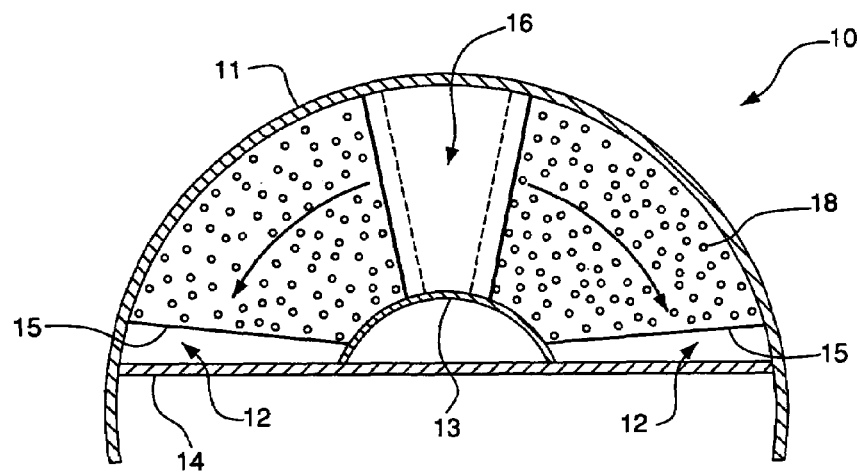
FIG. 1 is a schematic diagram illustrating a plan view of a tray for one embodiment of the present invention.
Figure 2:
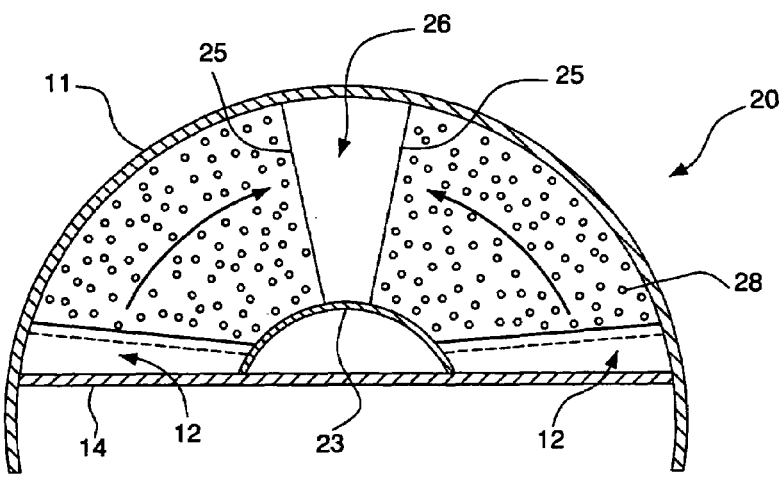
FIG. 2 is a schematic diagram illustrating a plan view for another tray to be vertically spaced apart from the tray shown in FIG. 1 for one embodiment of the present invention.

An exchange column, having a column wall 11, may contain a series of vertically spaced apart trays, such as the two trays (10, 20) shown in FIGS. 1 and 2. FIG. 1 shows an upper tray 10, and FIG. 2 shows a lower tray 20.

Referring to FIG. 1, the tray 10 is disposed in the exchange column between the column wall 11 and the dividing wall 14. A central downcomer 16 transmits liquid downward to tray 10 from another tray (not shown) above. Downcomers 12 transmit liquid from this upper tray 10 to a lower tray 20 (FIG. 2). Central downcomer 16 and downcomers 12 are positioned radially from a divider pan 13 to the column wall 11. As indicated by the directional arrows across the tray 10, liquid flows from the central downcomer 16 toward the outlet weirs 15, which project upward from the downcomers 12.

Referring to FIG. 2, the lower tray 20 is disposed in the exchange column between the dividing wall 14 and the column wall 11. Downcomers 12 transmit the liquid to the lower tray 20 from the upper tray 10 (FIG. 1). Liquid flows from the downcomers 12 toward the central downcomer 26, which transmits the liquid to another tray (not shown) below tray 20. The liquid passes over the outlet weirs 25 to enter the central downcomer. The downcomers 12 and the central downcomer 26 are radially positioned between a divider pan 23 and the column wall 11.

As shown in FIG. 2, liquid flows from the two downcomers 12 of the upper tray 10 near the dividing wall 14 toward a central downcomer 26 of the lower tray 20, as indicated by the directional arrows across tray 20. On the adjacent upper tray 10, the liquid splits into substantially equal parts and flows along a substantially semi-circular path toward the downcomers 12 near the dividing wall 14. This alternating pattern continues through a series of trays in the exchange column.

Vapor flows up through a bubbling area on each tray (10, 20). The bubbling area may be perforated sieve material, or may contain bubble caps, tray valves, or any other such mass transfer enhancing devices known in the field. In FIGS. 1 and 2, the bubbling area is illustrated by the perforations or apertures (18, 28).

The trays (10, 20) may be supported using conventional tray rings (not shown) attached to the column wall 11 and the dividing wall 14. Depending on the size of the exchange column, additional supports (not shown) under the trays and downcomers may or may not be required.

Figure 3:
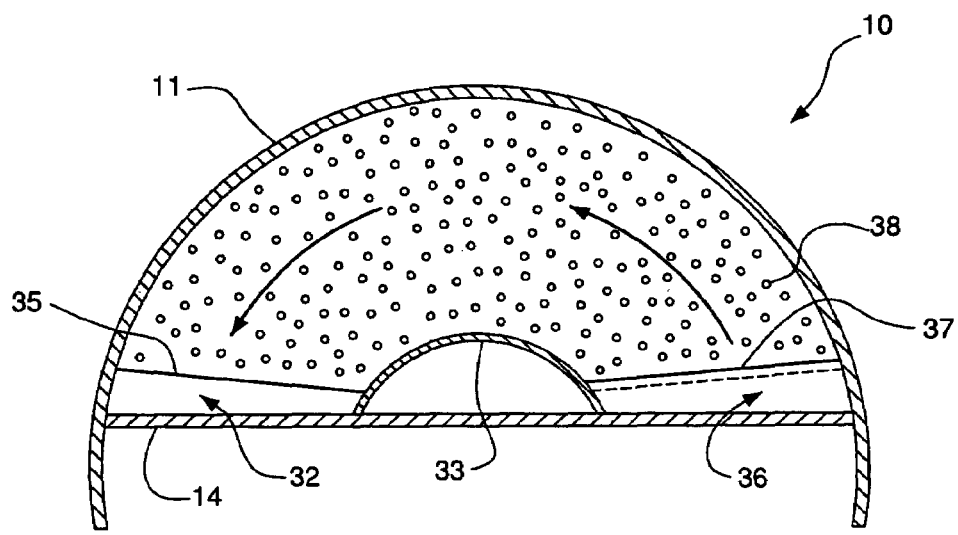
FIG. 3 is a schematic diagram illustrating a plan view of a tray for another embodiment of the present invention.
Figure 4:
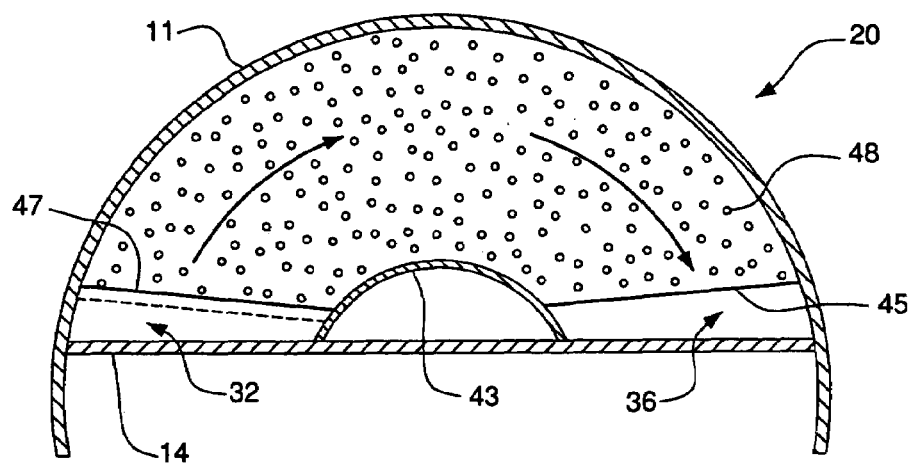
FIG. 4 is a schematic diagram illustrating a plan view for another tray to be vertically spaced apart from the tray shown in FIG. 3 for another embodiment of the present invention.

Another embodiment of the invention is illustrated in FIGS. 3 and 4. This embodiment is perhaps best suited for applications involving exchange columns having relatively small diameters.

Referring to FIG. 3, the upper tray 10 is disposed in the exchange column between the column wall 11 and the dividing wall 14. The downcomer 36 transmits liquid downward to tray 10 from another tray (not shown) above. The liquid flows over inlet weir 37 on tray 10 and continues across the tray (as indicated by the directional arrows) to outlet weir 35, where the liquid flows over the outlet weir and into the downcomer 32. In the embodiment illustrated, downcomer 32 is adjacent the dividing wall 14 and extends radially from a divider pan 33 to the column wall 11. Downcomer 32 transmits liquid from the upper tray 10 to the lower tray 20 (FIG. 4).

Referring to FIG. 4, the lower tray 20 is disposed in the exchange column between the dividing wall 14 and the column wall 11. Downcomer 32 transmits the liquid to the lower tray 20 from the upper tray 10. The liquid flows over the inlet weir 47 across the tray 20 (as indicated by the directional arrows) to the outlet weir 45, which the liquid passes over to enter downcomer 36 and flow to the tray below (not shown). Downcomer 32 and downcomer 36 are radially positioned between the divider pan 43 and the column wall 11.

As shown by the directional arrows for liquid flow in FIGS. 3 and 4, the liquid flows in a counter clockwise direction on the upper tray 10 and in a clockwise direction on the lower tray 20. Persons skilled in the art will recognize that the flow directions may be reversed (i.e., clockwise on the upper tray and counter clockwise on the lower tray) by constructing mirror images of the trays.

Figure 5:
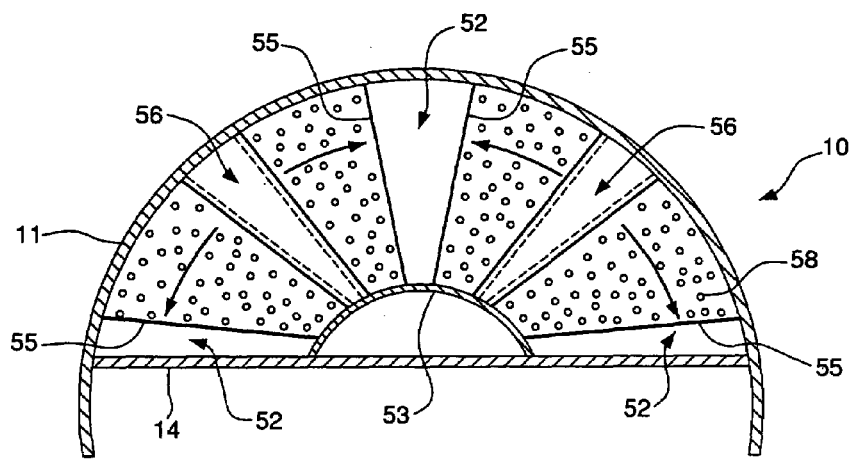
FIG. 5 is a schematic diagram illustrating a plan view of a tray for yet another embodiment of the present invention.
Figure 6:
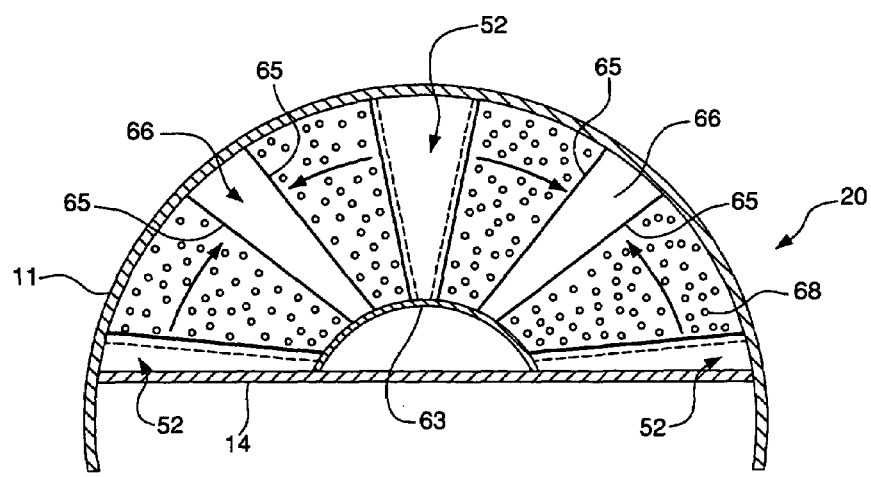
FIG. 6 is a schematic diagram illustrating a plan view for another tray to be vertically spaced apart from the tray shown in FIG. 5 for yet another embodiment of the present invention.

FIGS. 5 and 6 illustrate yet another embodiment of the present invention using "multiple pass" trays. This embodiment is perhaps best suited for use in applications involving exchange columns having relatively large diameters.

Referring to FIG. 5, the upper tray 10 is disposed in the exchange column between the column wall 11 and the dividing wall 14. Downcomers 56 transmit liquid downward to tray 10 from another tray (not shown) above. Downcomers 52 transmit liquid from the upper tray 10 to the lower tray 20 (FIG. 6). Downcomers 56, which transmit liquid downward to tray 10 from the tray above, and downcomers 52, which transmit liquid downward to the lower tray 20, are positioned radially from a divider pan 53 to the column wall 11. Similar to the pattern in FIG. 1, the liquid on the upper tray 10 in FIG. 5 flows away from downcomers 56 toward the adjacent downcomers 52, as indicated by the directional arrows for liquid flow. To enter each of the downcomers 52, the liquid flows over an outlet weir 55. (However, persons skilled in the art will recognize that it is possible to design a tray to operate without an outlet weir(s).)

Referring to FIG. 6, the lower tray 20 is disposed in the exchange column between the dividing wall 14 and the column wall 11. Downcomers 52 transmit the liquid to the lower tray 20 from the upper tray 10. Similar to FIG. 2, the liquid on the lower tray 20 in FIG. 6 flows (as indicated by the directional arrows) from each downcomer 52 toward an adjacent downcomer 66, which transmits the liquid downward to another tray (not shown) below tray 20. The liquid passes over an outlet weir 65 to enter one of the downcomers 66. The downcomers 52, which transmit liquid from the upper tray 10 to the lower tray 20, and the downcomers 66 which transmit liquid from tray 20 to another tray below, are radially positioned between a divider pan 63 and the column wall 11.

As with the embodiment illustrated in FIGS. 1 and 2, vapor flows up through a bubbling area on each tray (10, 20) in the embodiment illustrated in FIGS. 3 and 4 (for smaller diameter columns) and in the embodiment illustrated in FIGS. 5 and 6 (for larger diameter columns). The bubbling area may be perforated sieve material, or may contain bubble caps, tray valves, or any other such mass transfer enhancing devices known in the field. In FIGS. 3 and 4, the bubbling area is illustrated by the perforations or apertures (38, 48), and in FIGS. 5 and 6, the bubbling area is illustrated by similar perforations or apertures (58 and 68).

Persons skilled in the art will recognize that there are many other embodiments and variations of the present invention in addition to those shown in FIGS. 1-6. Although symmetry has been used in FIGS. 1-6 to generally illustrate and explain the present invention, such symmetry (although preferred) is not required, and the present invention is not limited to the generally symmetrical embodiments illustrated and discussed herein.

In FIGS. 1-6 the dividing wall divides the interior space of the exchange column in equal halves (since the dividing wall, as shown, crosses the diameter of the cylindrical column). However, the dividing wall may be a chord at a location other than the diameter, resulting in unequal interior spaces on either side of the dividing wall. In addition, the shape of the exchange column could be other than cylindrical. However, since distillation columns are almost always pressure vessels (either positive or negative (vacuum) pressure), the columns typically are designed to be round due to mechanical design considerations.

For those and other reasons, the terms "radial" and "radially," as used herein, are somewhat different than the ordinary dictionary definitions for those terms. As used herein, radial and radially means in a direction generally from the midsection of the dividing wall toward the column wall.

In the case of a cylindrical column with a dividing wall at the diameter of the column, the middle of the dividing wall is at the center of the cylinder. All radial lines would extend radially from that center point. However, such perfectly symmetrical geometry is not required with the present invention.

In FIGS. 1-6, the downcomers and liquid receiving areas extend radially from a divider pan to the column wall. Persons skilled in the art will recognize, however, that a divider pan is not necessary or required to be used with the trays of the present invention. A divider pan provides structural support and stability, but may be eliminated or replaced with other structural means. The divider pan also serves another practical purpose. Without something like the divider plan, the question would arise as to how close to the center of the column to extend the downcomers. If they get too close to each other, then liquid could travel very quickly from one incoming downcomer to the exiting downcomer with very little time for mass transfer to take place. If the downcomers are not extended inward, and there is no divider pan, this would create a zone where liquid could stagnate and not effectively flow across the flow path.

In the claims which follow, reference is made to various angles, which angles are measured relative to the dividing wall. For example, in FIG. 1, the "central" downcomer 16 is considered to be at an angle of 90° to the dividing wall. Persons skilled in the art will recognize that the "central" downcomer, however, may be positioned at other angles greater than or less than 90° relative to the dividing wall.

Radial downcomer 12 on the right hand side of FIG. 1 is considered to be at 0° relative to the dividing wall and is "adjacent to" the dividing wall. Persons skilled in the art will recognize, however, that the radial axis of that radial downcomer is actually at an angle slightly greater than 0°, and further that said radial downcomer need not be exactly "adjacent to" the dividing wall, but could be moved or rotated counter clockwise slightly away from the dividing wall and still function.

Similarly, the radial downcomer 12 on the left hand side of FIG. 1 is considered to be at 180° relative to the dividing wall and is "adjacent to" the dividing wall. Persons skilled in the art will recognize, however, that the radial axis of said radial downcomer is actually at an angle slightly less than 180°, and will also recognize that said radial downcomer need not be exactly "adjacent to" the dividing wall, but could be moved or rotated clockwise slightly away from the dividing wall and still function.

Referring to the geometry of a circle or a cylinder, a ray at 0° is considered to be directly opposite a ray at 180°. In view of the discussion above, the radial axis of the radial downcomer 32 in FIG. 3 is considered to be at 180° or directly opposite the radial axis of the receiving area 36 in FIG. 3, even though the respective radial axes of said downcomer and said liquid receiving area are not exactly at 180° and 0° and therefore are not exactly "opposite." Because the geometry is not exact, the term "substantially" has been used herein. For example, in the claims, reference is made to a second direction "substantially opposite" the first direction.

Also, phrases such as a "substantial distance" have been used in the claims with regard to a radial distance (length) which something (e.g., a downcomer) extends across the cross sectional area of a column. Some such distances are illustrated in FIGS. 1-6 where, for example, a downcomer extends continuously all the way from the divider pan to the column wall. Persons skilled in the art will recognize, however, that the downcomers and liquid receiving areas could extend over other lesser distances, or be discontinuous, and still be considered as extending a "substantial distance" across the cross sectional area and yet still function. For example, a radial downcomer might not extend quite all the way to the column wall and/or all the way to the divider pan, or it might comprise a series of short downcomers arranged adjacent each other in a manner which would be the "equivalent" of one long, continuous downcomer.

In addition to the variations in symmetry discussed above, persons skilled in the art will recognize that the present invention may function with variations in shapes and sizes of components, such as the downcomers and the receiving areas. For example, in FIGS. 5 and 6, all of the corresponding components are shown to be of equal sizes and similar shapes. For example, both liquid receiving areas 56 are substantially similar in size and shape, and both radial downcomers 52 are substantially similar in size and shape. However, persons skilled in the art will recognize that those components could be made of dissimilar sizes and shapes in variations of the invention which would still function and would be covered by the claims below.

Accordingly, although illustrated and described herein with reference to certain specific embodiments, the present invention is nevertheless not intended to be limited to the details shown. Rather, various modifications may be made in the details within the scope and range of equivalents of the claims and without departing from the spirit of the invention.

The invention claimed is:

1. An assembly of a plurality of vertically spaced apart trays for fractional distillation in a divided wall exchange column having an inner column wall, a dividing wall, a cross sectional area, and an interior space between the inner column wall and the dividing wall, the assembly comprising:
   a first tray disposed in the interior space, the first tray having
      at least one radial downcomer adjacent the dividing wall and extending radially toward the inner column wall a first substantial distance across the cross sectional area, and
      a first liquid receiving area having a radial axis at a first angle to the dividing wall and extending radially toward the inner column wall a second substantial distance across the cross sectional area,
   wherein at least a portion of a flow of liquid received from above on the first liquid receiving area flows across a portion of the first tray from the first liquid receiving area to the at least one radial downcomer, the at least one radial downcomer being adapted to receive and transmit downward at least part of said flow of liquid; and
   a second tray disposed in the interior space below the first tray, the second tray having
      at least one other downcomer having a radial axis at a second angle to the dividing wall and extending radially toward the inner column wall a third substantial distance across the cross sectional area, and
      at least one second liquid receiving area adjacent the dividing wall and extending radially toward the inner column wall a fourth substantial distance across the cross sectional area, the at least one second liquid receiving area being adapted to receive at least a portion of said flow of liquid transmitted downward from the at least one radial downcomer,
   wherein at least part of a flow of liquid received on the second liquid receiving area flows across a portion of the second tray from the second receiving area to the at least one other downcomer, the at least one other downcomer being adapted to receive and transmit downward at least part of said flow of liquid.

2. An assembly as in claim 1, wherein at least one of the first angle and the second angle is about 90°.

3. An assembly as in claim 1, wherein at least one of the first angle and the second angle is greater than 90°.

4. An assembly as in claim 1, wherein at least one of the first angle and the second angle is less than 90°.

5. An assembly as in claim 1, wherein a first portion of the flow of liquid received from above on the first liquid receiving area flows in a clockwise direction from the first liquid receiving area and a second portion of said flow of liquid flows in a counterclockwise direction from the first liquid receiving area.

6. An assembly as in claim 1, wherein a first part of the flow of liquid received on the second liquid receiving area flows in a counterclockwise direction toward the at least one other downcomer and a second part of said flow of liquid flows in a clockwise direction toward the at least one other downcomer.

7. An assembly as in claim 1, wherein the at least a portion of the flow of liquid flows across the portion of the first tray in a first direction and the at least part of the flow of liquid flows across the portion of the second tray in a second direction opposite the first direction.

8. An assembly as in claim 1, further comprising a plurality of apertures or other vapor passing means in or on at least a portion of at least one of the first tray and the second tray.

9. An assembly as in claim 1, further comprising at least one liquid mixer in fluid communication with at least one of the at least one radial downcomer and the at least one other downcomer, the at least one liquid mixer adapted to mix a plurality of liquid compositions.

10. An assembly as in claim 1, further comprising a divider pan adjacent the dividing wall, wherein the at least one radial downcomer and the at least one other downcomer extend radially from the divider pan toward the inner column wall.

11. An assembly as in claim 1, further comprising at least one outlet weir on the first tray adjacent the at least one radial downcomer.

12. An assembly as in claim 1, further comprising at least one outlet weir on the second tray adjacent the at least one other downcomer.

13. An assembly of a plurality of vertically spaced apart trays for fractional distillation in a divided wall exchange column having an inner column wall, a dividing wall, a cross sectional area, and an interior space between the inner column wall and the dividing wall, the assembly comprising:
  a first tray disposed in the interior space, the first tray having
    at least one radial downcomer adjacent the dividing wall and extending radially toward the inner column wall a first substantial distance across the cross sectional area, and
    a first liquid receiving area having a radial axis at a first angle to the dividing wall and extending radially toward the inner column wall a second substantial distance across the cross sectional area, and
    a plurality of apertures or other vapor passing means in or on at least a portion of the first tray,
    wherein at least a portion of a flow of liquid received from above on the first liquid receiving area flows across a portion of the first tray from the first liquid receiving area to the at least one radial downcomer, the at least one radial downcomer being adapted to receive and transmit downward at least part of said flow of liquid, and
  wherein a first portion of the flow of liquid received from above on the first liquid receiving area flows in a clockwise direction from the first liquid receiving area and a second portion of said flow of liquid flows in a counterclockwise direction from the first liquid receiving area; and
  a second tray disposed in the interior space below the first tray, the second tray having
    at least one central downcomer having a radial axis at a second angle to the dividing wall and extending radially toward the inner column wall a third substantial distance across the cross sectional area,
    at least one second liquid receiving area adjacent the dividing wall and extending radially toward the inner column wall a fourth substantial distance across the cross sectional area, the at least one second liquid receiving area being adapted to receive at least a portion of said flow of liquid transmitted downward from the at least one radial downcomer, and
    a plurality of apertures or other vapor passing means in or on at least a portion of the second tray,
    wherein at least part of a flow of liquid received on the second liquid receiving area flows across a portion of the second tray from the second receiving area to the at least one central downcomer, the at least one central downcomer being adapted to receive and transmit downward at least part of said flow of liquid, and
    wherein a first part of the flow of liquid received on the second liquid receiving area flows in a counterclockwise direction toward the at least one central downcomer and a second part of said flow of liquid flows in a clockwise direction toward the at least one central downcomer.

14. An assembly of a plurality of vertically spaced apart trays for fractional distillation in a divided wall exchange column having an inner column wall, a dividing wall, a cross sectional area, and an interior space between the inner column wall and the dividing wall, the assembly comprising:
  a first tray disposed in the interior space, the first tray having
    at least one radial downcomer adjacent the dividing wall and extending radially toward the inner column wall a first substantial distance across the cross sectional area in a first direction,
    a first liquid receiving area having a first radial axis adjacent the dividing wall and extending radially toward the inner column wall a second substantial distance across the cross sectional area in a second direction substantially opposite the first direction, and
    a plurality of apertures or other vapor passing means in or on at least a portion of the first tray,
    wherein at least a portion of a flow of liquid received from above on the first liquid receiving area flows across a portion of the first tray from the first liquid receiving area to the at least one radial downcomer, the at least one radial downcomer being adapted to receive and transmit downward at least part of said flow of liquid; and
  a second tray disposed in the interior space below the first tray, the second tray having
    at least one other downcomer having a second radial axis adjacent the dividing wall and extending radially toward the inner column wall a third substantial distance across the cross sectional area in a third direction,
    at least one second liquid receiving area adjacent the dividing wall and extending radially toward the inner column wall a fourth substantial distance across the cross sectional area in a fourth direction substantially opposite the third direction, the at least one second liquid receiving area being adapted to receive at least a portion of said flow of liquid transmitted downward from the at least one radial downcomer, and
    a plurality of apertures or other vapor passing means in or on at least a portion of the second tray,
    wherein at least part of a flow of liquid received on the second liquid receiving area flows across a portion of the second tray from the second receiving area to the at least one other downcomer, the at least one other downcomer being adapted to receive and transmit downward at least part of said flow of liquid, and
    wherein the at least a portion of the flow of liquid flows across the portion of the first tray in a first direction and the at least part of the flow of liquid flows across the portion of the second tray in a second direction opposite the first direction.

15. An assembly of a plurality of vertically spaced apart trays for fractional distillation in a divided wall exchange column having an inner column wall, a dividing wall, a cross sectional area, and an interior space between the inner column wall and the dividing wall, the assembly comprising:
  a first tray disposed in the interior space, the first tray having
    a plurality of spaced apart radial downcomers, each radial downcomer extending radially toward the inner column wall a first substantial distance or another substantial distance across the cross sectional area, and
    a plurality of first liquid receiving areas, each first liquid receiving area being positioned between and adjacent to two of the radial downcomers and extending radially toward the inner column wall a second substantial distance or an other substantial distance across the cross sectional area, and a plurality of apertures or other vapor passing means in or on at least a portion of the first tray, wherein at least a portion of a flow of liquid received from above on each of the first liquid receiving areas flows across a portion of the first tray from said first liquid receiving area to one of the two adjacent radial downcomers, said radial downcomer being adapted to receive and transmit downward at least part of said flow of liquid, and wherein a first portion of the flow of liquid received from above on at least one of the first liquid receiving areas flows in a clockwise direction from said first liquid receiving area and a second portion of said flow of liquid flows in a counterclockwise direction from said first liquid receiving area; and a second tray disposed in the interior space below the first tray, the second tray having a plurality of spaced apart other downcomers, each of the other downcomers extending radially toward the inner column wall a third substantial distance or another distance across the cross sectional area, and a plurality of second liquid receiving areas, each second liquid receiving area being positioned between and adjacent to two of the other downcomers and extending radially toward the inner column wall a fourth substantial distance or an other distance across the cross sectional area, each of said second liquid receiving areas being adapted to receive at least a portion of said flow of liquid transmitted downward from one of the radial downcomers, and a plurality of apertures or other vapor passing means in or on at least a portion of the second tray, wherein at least part of a flow of liquid received on each of the second liquid receiving areas flows across a portion of the second tray from said second receiving area to one of the two adjacent other downcomers, said other downcomer being adapted to receive and transmit downward at least part of said flow of liquid, and wherein a first part of the flow of liquid received on said second liquid receiving area flows in a counterclockwise direction toward said at least one other downcomer and a second part of said flow of liquid flows in a clockwise direction toward said at least one other downcomer.

16. An apparatus, comprising:

an exchange column having a primary longitudinal axis, an inner wall spaced apart from and surrounding the primary longitudinal axis, thereby being an interior space between the inner wall and the primary longitudinal axis;

a dividing wall disposed in the interior space, the dividing wall having a first side and a second side and dividing the interior space into at least a first longitudinal space having a first cross sectional area adjacent the first side of the dividing wall and a second longitudinal space having a second cross sectional area adjacent the second side of the dividing wall;

a first tray disposed in the first longitudinal space, the first tray having at least one radial downcomer adjacent the dividing wall and extending radially toward the inner column wall a first substantial distance across the first cross sectional area, and a first liquid receiving area having a radial axis at a first angle to the dividing wall and extending radially toward the inner column wall a second substantial distance across the first cross sectional area, wherein at least a portion of a flow of liquid received from above on the first liquid receiving area flows across a portion of the first tray from the first liquid receiving area to the at least one radial downcomer, the at least one radial downcomer being adapted to receive and transmit downward at least part of said flow of liquid; and a second tray disposed in the first longitudinal space below the first tray, the second tray having at least one other downcomer having a radial axis at a second angle to the dividing wall and extending radially toward the inner column wall a third substantial distance across the first cross sectional area, and at least one second liquid receiving area adjacent the dividing wall and extending radially toward the inner column wall a fourth substantial distance across the first cross sectional area, the at least one second liquid receiving area being adapted to receive at least a portion of said flow of liquid transmitted downward from the at least one radial downcomer, wherein at least part of a flow of liquid received on the second liquid receiving area flows across a portion of the second tray from the second receiving area to the at least one other downcomer, the at least one other downcomer being adapted to receive and transmit downward at least part of said flow of liquid.

17. An apparatus as in claim 16, wherein the first cross sectional area is greater than or substantially equal to the second cross sectional area.

18. An apparatus as in claim 16, wherein the second cross sectional area is greater than the first cross sectional area.

19. A method for assembling an assembly of a plurality of vertically spaced apart trays for factional distillation in a divided wall exchange column, comprising the steps of:

providing an exchange column having a primary longitudinal axis, an inner wall spaced apart from and surrounding the primary longitudinal axis, thereby being an interior space between the inner wall and the primary longitudinal axis;

installing a dividing wall in the interior space, the dividing wall having a first side and a second side and dividing the interior space into at least a first longitudinal space having a first cross sectional area adjacent the first side of the dividing wall and a second longitudinal space having a second cross sectional area adjacent the second side of the dividing wall;

installing a first tray in the first longitudinal space, the first tray having at least one radial downcomer adjacent the dividing wall and extending radially toward the inner column wall a first substantial distance across the first cross sectional area, and a first liquid receiving area having a radial axis at a first angle to the dividing wall and extending radially toward the inner column wall a second substantial distance across the first cross sectional area, wherein at least a portion of a flow of liquid received from above on the first liquid receiving area flows across a portion of the first tray from the first liquid receiving area to the at least one radial downcomer, the at least one radial downcomer being adapted to receive and transmit downward at least part of said flow of liquid; and installing a second tray in the first longitudinal space below the first tray, the second tray having
- at least one other downcomer having a radial axis at a second angle to the dividing wall and extending radially toward the inner column wall a third substantial distance across the first cross sectional area, and
- at least one second liquid receiving area adjacent the dividing wall and extending radially toward the inner column wall a fourth substantial distance across the first cross sectional area, the at least one second liquid receiving area being adapted to receive at least a portion of said flow of liquid transmitted downward from the at least one radial downcomer, wherein at least part of a flow of liquid received on the second liquid receiving area flows across a portion of the second tray from the second receiving area to the at least one other downcomer, the at least one other downcomer being adapted to receive and transmit downward at least part of said flow of liquid.

20. A process for cryogenic air separation, comprising contacting vapor and liquid counter-currently in a divided wall exchange column containing at least one mass transfer zone wherein a liquid-vapor contact is established by an assembly of a plurality of vertically spaced apart trays as in claim 1.

21. A process for exchanging mass and/or heat between two fluids, comprising contacting said fluids in a divided wall exchange column wherein a fluid-fluid contact is established by an assembly of a plurality of vertically spaced apart trays as in claim 1.

* * * * *